US007193502B2

(12) United States Patent
Vandrunen et al.

(10) Patent No.: US 7,193,502 B2
(45) Date of Patent: Mar. 20, 2007

(54) OPERATING SYSTEM AND METHODS FOR SEEDING A RANDOM SERIAL NUMBER FOR RADIO FREQUENCY CONTROL OF A BARRIER OPERATOR'S ACCESSORIES

(75) Inventors: Paul J. Vandrunen, Navarre, FL (US); James S. Murray, Milton, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 316 days.

(21) Appl. No.: 10/794,550

(22) Filed: Mar. 6, 2004

(65) Prior Publication Data

US 2005/0195066 A1 Sep. 8, 2005

(51) Int. Cl.
*H04Q 1/00* (2006.01)
*G06F 7/04* (2006.01)

(52) U.S. Cl. .................... 340/5.71; 340/5.61; 340/5.23

(58) Field of Classification Search .............. 340/5.71, 340/5.7, 5.61, 539.1, 5.23, 825.22, 825.69; 318/16
See application file for complete search history.

(56) References Cited

U.S. PATENT DOCUMENTS 4,884,060 A * 11/1989 Shapiro ...................... 340/514
5,751,224 A 5/1998 Fitzgibbon ............. 340/825.22
5,793,300 A 8/1998 Suman et al. ............ 340/825.2
5,838,226 A 11/1998 Houggy et al. ........ 340/310.01
5,905,442 A 5/1999 Mosebrook et al. ... 340/825.06
5,969,637 A 10/1999 Doppelt et al. ........ 340/825.69
6,049,289 A 4/2000 Waggamon et al. ... 340/825.31
6,568,454 B1 5/2003 Mullet et al. ............... 160/188
6,647,402 B1 11/2003 Chiu .......................... 708/250
2002/0014954 A1 * 2/2002 Fitzgibbon et al. ........ 340/5.64
2003/0174044 A1 9/2003 Murray ...................... 340/5.25

FOREIGN PATENT DOCUMENTS

WO WO 03/100733 A 4/2003

* cited by examiner

*Primary Examiner*—Edwin C. Holloway, III
(74) *Attorney, Agent, or Firm*—Renner Kenner Greive Bobak Taylor & Weber

(57) ABSTRACT

An operating system for a motorized barrier includes an operator for controlling movement of the barrier between various positions and an accessory. The system includes a wall station transmitter, a wireless keyless entry transmitter and/or a portable remote transmitter. The system also includes an accessory device such as a light fixture or switch that controls a load, wherein the device is capable of also receiving wireless signals to control the fixture or the load. The system allows for pre-storing of an operator serial number that is needed to communicate with the accessory devices. The operator serial number may also be randomly derived from a timer or by parsing a serial number generated by one of the transmitters.

18 Claims, 3 Drawing Sheets

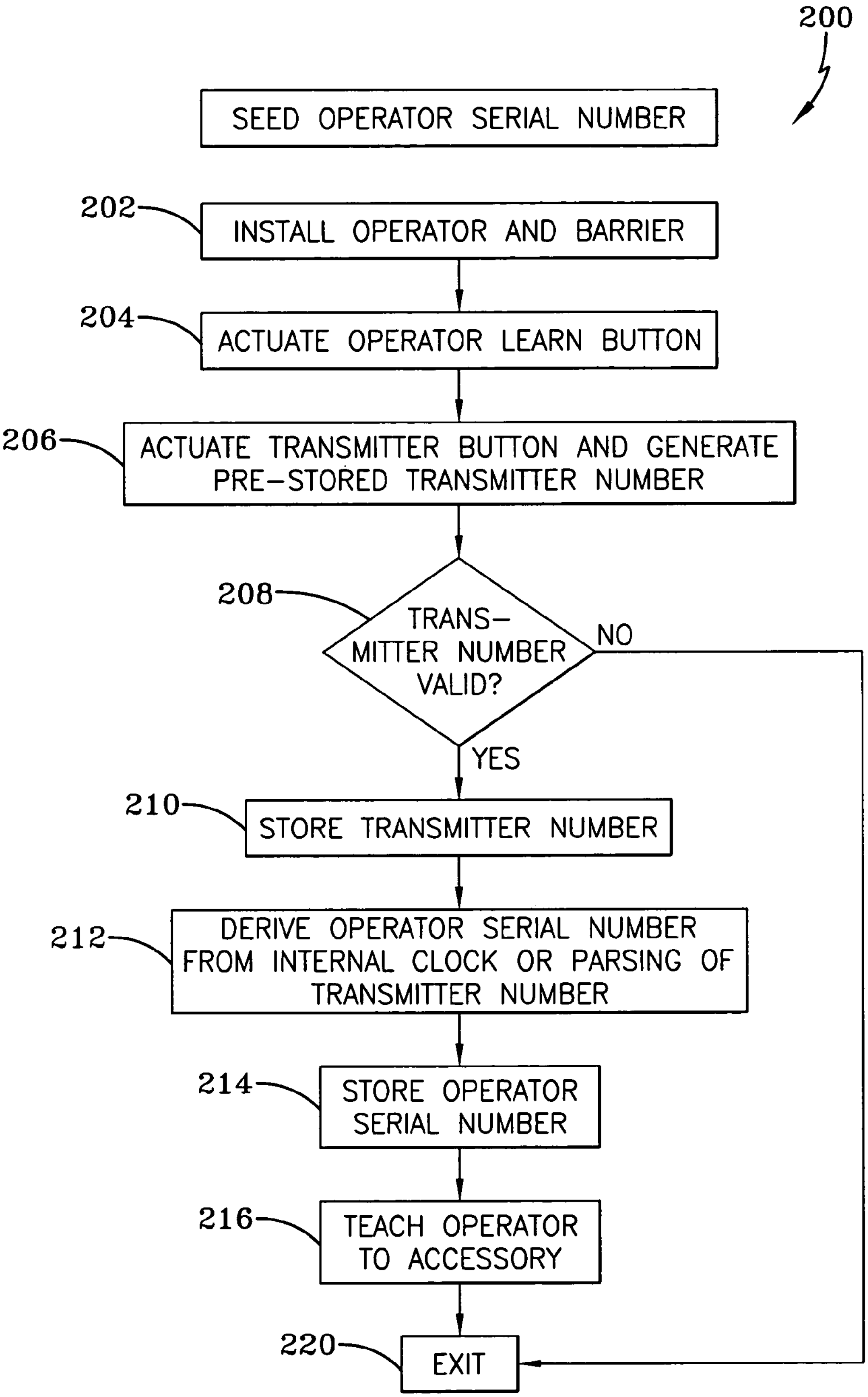
FIG−3

OPERATING SYSTEM AND METHODS FOR SEEDING A RANDOM SERIAL NUMBER FOR RADIO FREQUENCY CONTROL OF A BARRIER OPERATOR'S ACCESSORIES

TECHNICAL FIELD

Generally, the present invention relates to a barrier operator system for use on a closure member moveable relative to a fixed member. More particularly, the present invention relates to an operating system that provides for the learning of a serial number for association with a barrier operator that allows for radio frequency control of operator accessories.

BACKGROUND ART

As is well known, garage doors or gates enclose an area to allow selective ingress and egress to and from the area. Garage doors initially were moveable by hand. But due to their weight and the inconvenience of opening and closing the door, motors are now linked to the door through an operator controller. Control of such a motor may be provided by a hard-wired or wireless push button which, when actuated, relays a signal to the operator controller that starts the motor and moves the door in one direction until a predetermined limit is reached. When the button is pressed again, the motor moves the door in an opposite direction. Garage door operators are now provided with safety features which stop and reverse the door travel when an obstruction is encountered. Other safety devices, such as photoelectric sensors, detect whenever there is an obstruction within the path of the door and send a signal to the operator to take corrective action. Remote control devices are now also provided to facilitate the opening and closing of the door without having to get out of the car. The prior art also discloses utilizing the operator to turn a light or switch on and off via a direct wired connection. This and other operator-related conveniences are disclosed herein.

U.S. Pat. No. 6,568,454 to Mullet, et al. discloses a system for raising and lowering a sectional overhead door between an open position and a closed position including, a counterbalance system adapted to be connected to the door, an operator motor assembly mounted proximated to the sectional overhead door in the closed position of the sectional overhead door, at least a portion of the operator motor assembly moveable between a door operating position and a door locking position, and a locking assembly having an engaged position to hold the motor assembly in the operating position and a disengaged position to release the motor assembly allowing it to move to the door locking position. The system may be provided with a remote light assembly having a switchable light source that senses communication with the operator motor such that operation of the motor activates the light source. The command data for the remote light assembly is not transmitted over a RF media. Instead, an IR media is used which is limited to line-of-sight and the operator must have an IR emitter which is visible on the front cover of the operator. Since the IR is line-of-sight, the operator has no need nor does it create unique nor random serial numbers, instead it reads the state of the channel selector in the operator which can be set such that up to 4 channels can be selected. On the receiving end, the light fixture receives the message and checks the channel to verify that it is the intended recipient of the message. If the channel selects do not match, the light fixture rejects the message. Otherwise, the message is accepted and the operator acts accordingly.

U.S. Pat. No. 5,751,224 to Fitzgibbon discloses a movable barrier or garage door operator that has a control head controlling an electric motor connected to a movable barrier or garage door to open and close it. The control head has an RF receiver for receiving RF signals from a hand-held transmitter or a fixed keypad transmitter. The receiver operates the electric motor upon matching a received code with a stored code. The stored codes may be updated or loaded either by enabling the learn mode of the receiver from the fixed keypad transmitter or from a wired control unit positioned within the garage. This device controls both the operator and the garage light but both are controlled through the motor control board and not separate devices so separate communication is not required. This type of arrangement—by running the light control through the operator controls—causes the light to be responsive to the operator. For example, if the garage door is either in the open or closed position and the light has been activated by the light circuit, when the operator motor is activated, the control board will take the light on function and route it to the time delay circuit and turn the light out when the timer expires leaving the user in the dark until the light circuit is again manually activated. This device uses one receiver to receive the transmitted signal and can activate either the light or the motorized operator. However the light must be wired to the control board. Therefore, if the light is remote from the operator then wires must be run to connect the light to the control board. Because of this wiring issue, all the devices that practice this invention mount the light integral with the operator housing that contains the motor control board.

U.S. Pat. No. 5,905,442 to Mosebrook, et al. discloses an apparatus for controlling an electrical device by remote control including a control device coupled to the electrical device by a wire connection for providing power to the electrical device. The control device includes an actuator for adjusting the status of the electrical device, and a radio frequency transmitter/receiver and antenna for adjusting the status of the electrical device in response to control information in a radio frequency signal. The transmitter/receiver receives the radio frequency signal via the antenna and transmits a status radio frequency signal with information regarding the status of the electrical device. A master control unit has at least one actuator and status indicator and a transmitter/receiver for transmitting a radio frequency signal having the control information therein to control the status of the electrical device and for receiving the status information from the control device. The status indicator indicates the status of the electrical device in response to the status information. A repeater receives the radio frequency signal from the master unit and transmits the control information to the control device and receives the status information from the control device and transmits it to the master unit. This device relates to the control of electrical devices, and in particular, electric lamps, from remote locations. Even more particularly, the device relates to the control of electrical devices such as electric lamps from remote locations through communication links, e.g., radio frequency links. In particular, the device relates to a system for controlling electrical devices from remote locations over, for example, radio frequency links and which dispenses with any need to alter the internal wiring of the electrical system, i.e., the internal wiring of a building. This device is flawed in that it requires providing a manual actuator at the control device for adjusting the status of the electrical device.

U.S. Pat. No. 5,838,226 to Houggy, et al. discloses the control of electrical devices, and in particular, electric lamps from remote locations through radio frequency links. This device further relates to a system for controlling electrical devices from remote locations over communications links, e.g., radio frequency links, and which dispenses with any need to alter the internal wiring of the electrical system, i.e., the internal wiring of a building. And the device relates to a communication protocol for such a system for providing communications signals between components of the system to insure that each component reliably receives communications intended for it.

U.S. Pat. No. 5,969,637 to Doppelt, et al. discloses a garage door operator with a light control that includes a garage door movement apparatus for moving the garage door in an open and close direction within a doorway. The operator also includes a light having an on and an off state; a controller for generating a door movement signal for operating the door movement apparatus and for generating a light enable signal for operating the light in one of a plurality of on and off states; and an obstacle detector for detecting the presence of an obstruction in the doorway. The controller responds to the door state (traveling open, traveling closed and stopped open) in order to control operation of the door and activation of the lights. When the door state indicates the door is stopped open and the obstacle detector detects an obstruction in the doorway, the controller generates a light enable signal for enabling the light. This device requires a signal from a RF transmitter or a hard wired remote switch to the controller which then activates either the operator or the light, or both.

U.S. Pat. No. 5,793,300 to Suman, et al. discloses a control system that selectively controls the operation of at least one lamp and at least one garage door opener. The control system includes a control module which includes connectors adapted to be coupled to at least one lamp through household AC power conductors. The control module also includes terminals adapted to be connected to a garage door opener mechanism. A circuit positioned in the control module receives and identifies radio frequency signals, stores control information associated with a plurality of received signals from a remote control in a training mode and outputs control signals for communication over the AC power line and the garage door mechanism in accordance with the stored control signals when one of said remote control signals is received in an operating mode. The control module also includes a selector used to select garage door and/or light control operations to be associated with a signal received by the control module in a training mode. In this disclosure, the RF signal goes to a control module and then to the light or the operator.

Some prior art operator systems attempt to securely transmit radio frequency signals between the transmitter devices and the operator. If a transmission is not secure, then it is possible for an unauthorized person to capture the transmission for later illegal activities. Utilization of a fixed or rolling code may be incorporated into the transmissions to enhance their security.

All transmitter devices—wall station, portable or keyless—are shipped from the factory with a serial number that is recognized by operators. In other words, each transmitter serial number is in a range of serial numbers that are recognizable by operators made by the same manufacturer. Upon installation, a particular transmitter's serial number is then learned to the operator so that a transmission from the transmitter can control the operator. Associating a serial number with a transmitter requires at least one manufacturing step. This may be done by connecting a read-only memory chip with a designated serial number to the transmitter's controller for recognition by the operator. In the alternative, the serial number may be programmed into a designated memory device, but care needs to be taken to ensure that the numbers are not repeated and are within a designated range of numbers recognizable by the manufacturer's operators. These precautions need to be taken to ensure a high level of security of the transmissions from the transmitter to the operator.

In some of the prior art listed above, the control module for the lights is the same module for the operator so if there is a problem with one circuit, it could affect both units. Further, discrete signals are required for the control module to differentiate the command for the lights versus the command for the door. Further still, the lamp is normally activated to illuminate when the door operate command is issued and as mentioned above, once the activation occurs whether previously illuminated or not, the control module switches the light command to the time delay circuit and shuts off the light after a predetermined period of time. This necessitates a manual activation of the light after the control circuit times out. Accordingly, there is a need in the art for more flexibility in controlling lights in proximity to the enclosed area associated with the barrier. There is also a need for the ability to control movements of the barrier and an electrical "load"—such as an appliance—with the same device.

It will be appreciated that the security requirements for controlling operator accessories are less stringent than the requirements for controlling the operator's motor. Therefore, to allow for flexibility in controlling lights and other accessories by the operator there is a need for the operator to also be provided with a serial number to enable direct control of the accessories by the operator. As will be discussed, this need can be fulfilled by pre-storing or randomly generating an operator serial number.

DISCLOSURE OF INVENTION

In general, the present invention contemplates an operating system and methods for seeding a random serial number for radio frequency control of a barrier operator's accessories.

The present invention also contemplates an operator system for a motorized barrier and related accessory, comprising at least one transmitter capable of generating wireless signals; an accessory device which controls an electrical load, the device capable of receiving wireless signals; and an operator which controls the motorized barrier, the operator capable of receiving wireless signals to control the motorized barrier and generating wireless signals to control the accessory device.

The invention further contemplates a method for enabling an operator that controls a motorized barrier and an accessory device, comprising associating a serial number with the operator; and recognizing the serial number by the accessory device for operation thereof.

The invention also contemplates an operator system for a motorized barrier and related accessory comprising, at least one transmitter capable of generating wireless signals; an accessory device which controls an electrical load, the device capable of receiving wireless signals; an operator which controls the motorized barrier; a controller associated with the operator, the controller receiving wireless signals to control the motorized barrier and generating wireless signals to control the accessory device, the controller randomly generating an operator serial number at time of learning the at least one transmitter.

The invention also contemplates an operator system for a motorized barrier operator and related accessory comprising, at least one transmitter capable of generating wireless signals, the at least one transmitter having a pre-stored transmitter number; an accessory device which controls an electrical load, the device capable of receiving wireless signals; an operator which controls the motorized barrier; a controller associated with the operator, the controller receiving wireless signals to control the motorized barrier and generating wireless signals to control the accessory device, the controller deriving an operator serial number from the pre-stored transmitter number.

BRIEF DESCRIPTION OF THE DRAWINGS

For a complete understanding of the objects, techniques and structure of the invention, reference should be made to the following detailed description and accompanying drawings, wherein:

FIG. 3 is an operational flowchart setting out the operational steps for seeding a random serial number to an operator so as to permit communications with a radio frequency energized switch and light fixture for use with the operational system.

PREFERRED EMBODIMENT FOR CARRYING OUT THE INVENTION

Figure 1:
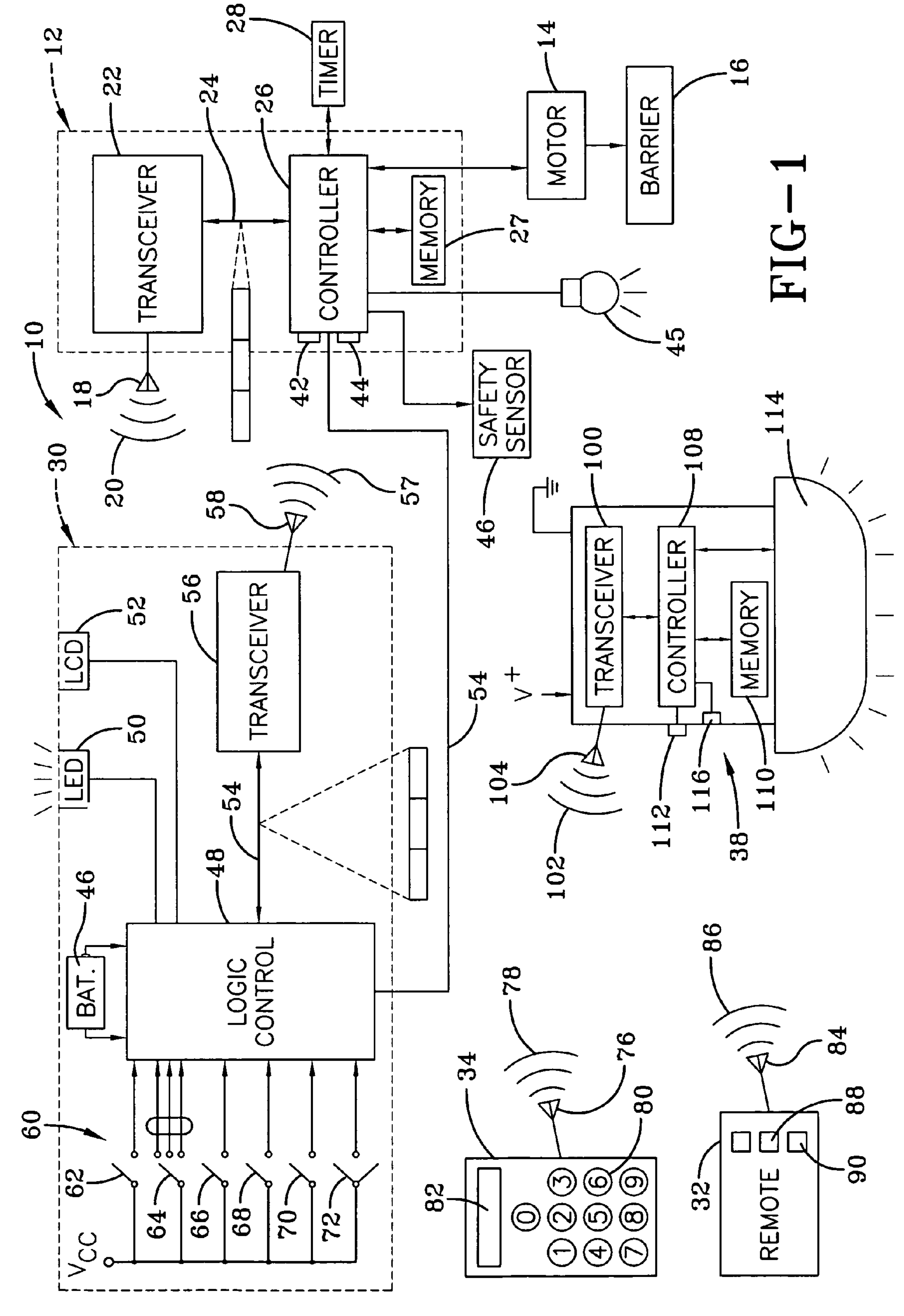
FIG. 1 is an operational system for a motorized barrier operator according to one embodiment of the present invention.

An operating system for a motorized door or gate operator according to the concepts of the present invention, depicted in FIG. 1 of the drawings, is generally indicated by the numeral 10. The system 10 may be employed in conjunction with a wide variety of movable barrier doors, or gates, shades or awnings, wherein the doors are of the type utilized in garages, commercial and utility buildings, and other structures, as well as windows or other closure members, all of which may be linear, curved, or otherwise non-linear, in whole or in part. Such barriers or other members are commonly constructed of a variety of materials such as wood, metal, various plastics, or combinations thereof. The lower extremity of doors or other member of these various types may be substantially rectangular or may be profiled in any number of ways for the positioning of reinforcing members or other purposes. In the preferred use, the present invention is utilized with residential-type garage doors.

As is well known, operating systems used for moving the barrier may take many forms. The most common operating systems include an operator 12 that controls operation of a motor 14 which is linked by any number of mechanisms such as gears, springs, cables and the like to a barrier 16. The operator and the motor may be placed in any number of positions with respect to the barrier and the operator/motor combination may be referred to in the art as header-mounted, trolley, jackshaft, screwdrive, wormdrive and so on. Upon receiving an operational command, the operator energizes the motor, which in turn moves the associated mechanisms connected to the barrier for movement thereof. The edges of the barrier are typically slidably retained and/or supported within rails or tracks. The operator 12 may be battery-powered or it may be powered by a residential power supply.

The operator 12 includes an antenna 18 for receiving or sending a radio frequency (RF) signal or any other type of signal associated with other components within the system. The radio frequency signal 20 is transferred to or received from a transceiver 22 which converts the radio frequency signal into a code signal 24 that is received by a controller 26. Alternatively, the controller 26 may receive the data signal, which is representative of the RF signal, directly by a wire. The controller 26 provides the necessary hardware, software and memory for use of the operator 12. Although the controller may maintain internal memory devices, the controller may also be in communication with a stand alone memory device 27. As will be discussed in greater detail, the memory device may be initially provided from the manufacturer without any data stored therein or, in the alternative, an operator serial number may be associated therewith. And a timer 28 may also be independently associated with the controller 26 if not internally provided therein.

Figure 2:
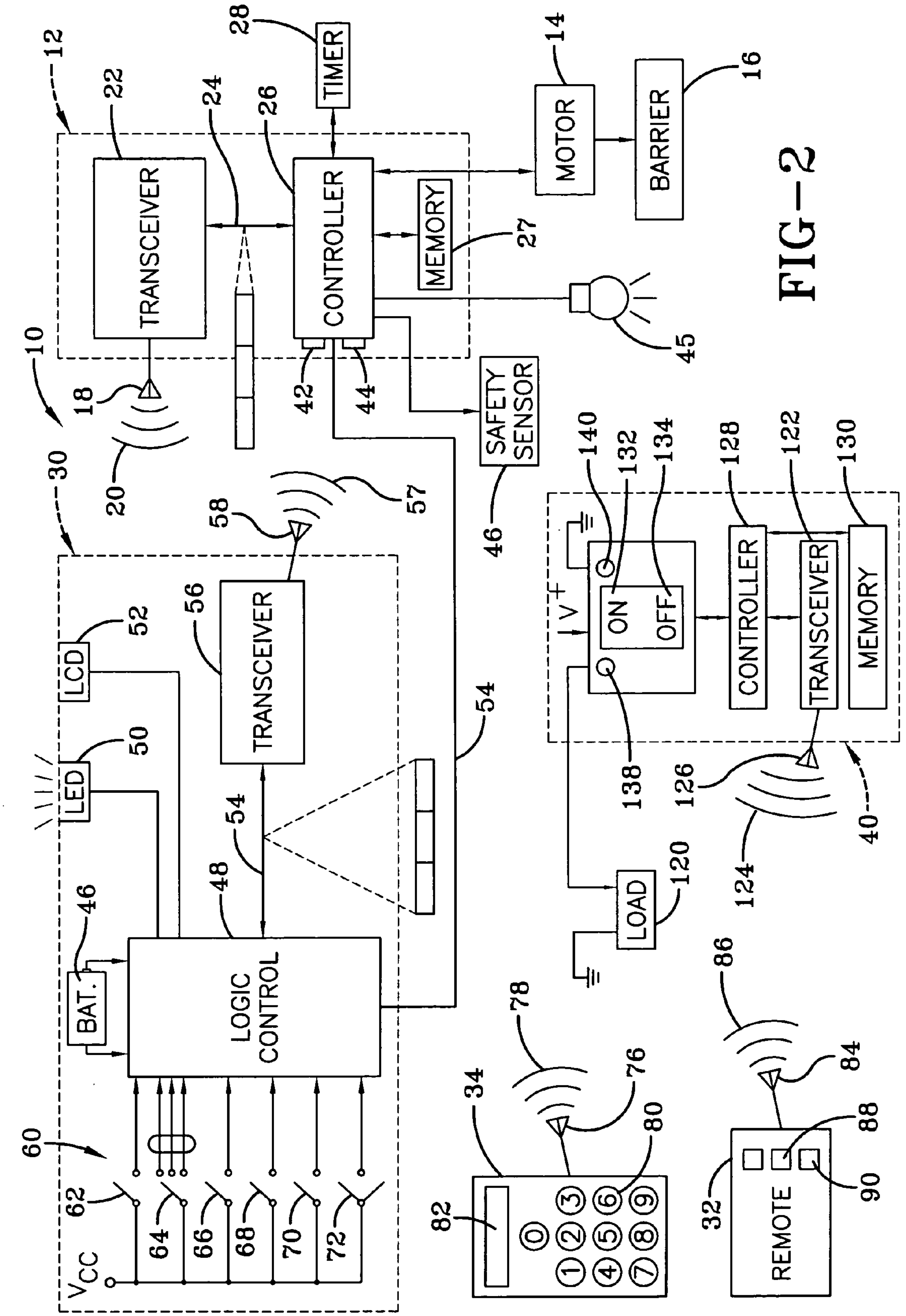
FIG. 2 is an operational system for a motorized barrier operator according to another embodiment of the present invention.

As will be discussed in greater detail below, the controller 26 receives and sends signals primarily for the movement of the barrier but also for implementing safety features and functional enhancements that facilitate use of the system. For the embodiments disclosed herein, the controller primarily receives operational commands from transmitters identified as a wall station transmitter 30, a remote or portable transmitter 32, or a keyless entry transmitter 34. These transmitters and the controller may also communicate with a light fixture, designated generally by the numeral 38 as shown in FIG. 1, and/or a load switch, designated generally by the numeral 40 as shown in FIG. 2. The transceiver 22 and the controller 26 may be configured to emit and/or receive one range or more than one range of RF signals. Likewise, the transmitters 30, 32, and 34 may be configured to emit and/or receive more than one range of RF signals. In the preferred embodiment, the controller receives one range of RF signals and then subsequently generates another range of RF signals. Preferably, the transmitters generate RF signals at about 372 MHz, and the operator is able to receive that range of signal and in turn generates signals at about 434 MHz. This is referred to as a "relay signal scheme." This may be done to prevent the switch from receiving interfering signals from nearby sources or so that the fixture or switch is compatible with other types of transmitter devices. Of course, the same frequency signal could be received by the transceiver 22, which in turn transmits a same frequency.

In view of the security function of the transmitters—allowing or denying access to a residence or building—each transmitter is shipped from the manufacturer with a unique serial number selected from a known range of serial numbers. In the preferred embodiment a 28 bit serial number may be used which results in a set of possible serial numbers of $2^{28}$ or 268,435,456. Of course, different bit lengths could be used if desired. Transmission of these serial numbers may be provided with encryption and may be in a fixed or rolling code format. The remaining details of the operator 12 will be discussed first followed by a review of the various transmitters. After this, the elements of the fixture 38 and the switch 40 will be reviewed including their operational details and programming thereof.

Associated with the controller 26 may be a light emitting diode (LED) program light 42 which indicates the operational status of the controller. A secondary light 45 may be directly wired to the controller 26 for the purpose of illuminating the area enclosed by the barrier. A program button 44 is connected to the controller 26 for the purpose of allowing programming or learning of the wireless devices such as the wall station, remote and keyless transmitters; the light fixture; the light switch; and the like to the operator 12. And a safety sensor 46 may be connected to the controller 26. The sensor 46 may be a photoelectric safety sensor, a door edge sensor or any other sensor that detects application of an excessive force by the moving barrier or the presence of an object in the barrier's path in either one or both directions.

The wall station transmitter 30 is typically placed near a door that enters the garage from the interior of the house and is preferably positioned at a convenient height of about five feet from the floor. The wall station 30 includes a housing typically made of polymeric material, wherein at least a portion of the housing is removable to allow access to the internal workings thereof when needed. The wall station 30 includes a battery compartment for receiving a power supply 46 which is preferably two AAA batteries. The power supply is used to provide electrical power to various components contained within the wall station as will become apparent as the description proceeds. It will be appreciated that power could be received from the operator, a residential power source or equivalent if desired. If such is the case then appropriate transformers will be needed to power the internal components. In any event, use of the dry cell batteries provide the necessary power and allow for the wall station 30 to be placed anywhere within communication range of the operator and other components and eliminates the need for obtaining power directly from the operator or other source. One component that is connected to the power supply is a logic control 48 which is a microprocessor based circuit that provides the necessary hardware, software and memory for implementing the functions to be described. An LED 50 is connected to the logic control and receives power from the power supply in a manner well known in the art. Also connected to the logic control 48 may be a liquid crystal display 52 or other low-power display for providing operational information related to the wall station and/or other components of the operating system 10. The logic control 48 generates various signals 54 which are received by a transceiver 56 for conversion to a radio frequency (RF) signal 57 that is emitted by an antenna 58. Of course other wireless types of signals, such as infrared or acoustic, could be generated by the transceiver 56 if desired. In any event, it will be appreciated that in the preferred embodiment the wall station 30 is a wireless device; however, if the need arises a wire could be used to directly transmit the signal 54 to the controller 26. As used herein, the term transceiver indicates that the device can both transmit and receive wireless signals. It is likely, however; that an identified transceiver will primarily perform one of the transmit and receive functions.

The wall station transmitter 30 includes a plurality of input switches or buttons designated generally by the numeral 60. These input switches, when actuated, allow the user to control various features of the operating system. The switches include an up/down switch 62; a 3-way selection switch 64, which provides the modes of manual close, auto-close, and radio frequency blocking; an install switch 66; a delay close switch 68; a pet height switch 70; and a light on/off switch 72. The up/down switch 62 is actuated whenever the user wants to move the barrier from an up condition to a down condition or vice versa. The 3-way selection switch 64 provides for different operational modes. Briefly, the manual close mode allows the operating system 10 to operate in much the same manner as would a normal operating system inasmuch as user input is required to open and close the movable barrier. The auto-close feature allows for the movable barrier to close if left in a fully open position for a predetermined period of time and provided that other conditions are met. The radio frequency blocking feature is for when a user is on vacation and desires that no external or remote transmitters allow for operation of the movable barrier. The install switch 66 provides for an installation routine to set the operational limits of the movable barrier with respect to the other physical parameters of the movable barrier. In other words, barrier travel limits and force profiles are generated during the actuation of the install routine. The delay close switch 68 allows for a user to exit the enclosed area within a predetermined period of time without inadvertently actuating safety features such as photoelectric eyes and the like. The pet height switch 70 allows for the door to be moved to a minimal open position of anywhere from 4 to 12 inches to allow the ingress and egress of small pets. The light switch 72 may be activated in either of two directions and turns the light 38 associated with the operating system 10 on and off. The switch 72 may also control the light 45.

Another of the transmitters that may be associated with the operator 12 is the keyless entry transmitter designated generally by the numeral 34. The keyless transmitter 34 provides an antenna 76 for transmitting and, if needed, receiving signals 78 to and from the operator 12. The keyless entry transmitter 76 includes a keypad 80 which allows for the user to enter a predetermined identification number or code to initiate movement of the barrier. A liquid crystal display 82 may be associated with the keyless transmitter if desired. Upon completion of the entry of the identification number a radio frequency signal 78 is emitted by the antenna.

Another type of transmitter is the remote transmitter 32 which provides an antenna 84 which emits a radio frequency signal 86. It will be appreciated that the remote transmitter 32 may include its own controller for the purpose of generating the appropriate radio frequency signal. The remote transmitter may include a main function button 88 and a plurality of auxiliary function buttons 90 that independently control other features associated with the operating system. In particular, actuation of one of the buttons may be used solely for control of the barrier while another of the buttons may independently control the light 38 associated with the operating system or other related features. Usually, the main function button initiates barrier movement and energization of the fixture 38 or switch 40.

As best seen in FIG. 1, the light fixture 38 is associated with the operating system 10. Generally, the light fixture is provided for the convenience of the user and the installer inasmuch as the light fixture is connectable to any standard duplex electrical outlet and does not need to be provided with power from the operator 12. The light fixture 38 may be used in conjunction with or in the alternative to the light 45 which is connected directly to the controller 36. The light fixture 38 may be mounted to a ceiling outlet, a wall outlet or to any residential power outlet. The light fixture is controlled by a radio frequency signal and as such placement of the light fixture is limited only by the range of the RF signal which it is programmed to receive. The fixture operates around a frequency of about 434 MHz. Of course, other frequencies could be used as permitted by regulatory agencies. The frequency may be set by a resonator or crystal in the factory so that no end-user adjustment can be made.

The light fixture 38 includes a transceiver 100 which is capable of receiving a radio frequency signal 102 via an antenna 104. The transceiver 100 primarily functions as a receiver in this embodiment. Any received or emitted signals passing through the transceiver are directed to or generated by a fixture controller 108 which may be provided with an external or internal memory device 110. It will be appreciated that the controller 108 includes all the necessary hardware, software and memory for incorporating the light fixture into the operating system 10. A program button 112 is connected to the controller 108 and allows for learning of different transmitters and/or the operator 12 so as to enable operation of the light fixture. And the light fixture 38 includes a light element 114 which is powered by the residential power as needed. A status light 116, which is preferably an LED, is connected to the controller 108 and is illuminated according to various states during use and programming thereof.

The light fixture 38 is programmable to be associated with the operator 12 and/or the transmitters 30, 32 and 34. The light fixture 38 will preferably be used with a garage door operating system 10. However, it will be appreciated that the light fixture may be operated separately as long as it is supplied with an appropriate transmitter device that can be learned to the controller 108. The data reception range of the light fixture is preferably up to 500 feet minimum in open air and in the line of sight of the device when tested with a compatible companion transmitting unit operating in either a rolling code or fixed code format. If a rolling code format is utilized, the controller will be able to properly decode the encrypted portion of the rolling code at a "one out of two" transmission data rate. It is envisioned that the fixture will be shipped to the consumer with all transmitter codes erased from the memory 110. When initially powered up, after a power failure and when power is restored, the fixture is programmed to turn the lighting element 114 on for a period of approximately one second and then turn the lighting element off. Once this power up process is complete the fixture will operate in its intended normal mode.

Referring now to FIG. 2, it can be seen that the switch is designated generally by the numeral 40. The switch 40 controls operation of a load 120 which may be a light, a bank of lights or any electrical appliance which is wired to the switch. It will be further appreciated that the switch 40 may be used simultaneously with the light fixture 38 or may be used separately. In any event, the switch 40 includes a transceiver 122 which receives and/or generates a radio frequency signal 124. In the preferred embodiments, the switch operates at a different frequency range than the wall station transmitter 30, the keyless external transmitter 34, and the remote transmitter 32. In the preferred embodiment, the RF switch 40 operates around a frequency of about 434 MHz. As with the light fixture, the frequency may be factory-set by a resonator or crystal with user adjustable control. The light switch's data reception range is preferably up to 500 feet minimum in open air and in the line of sight of the receiving or transmitting device when oriented for ideal reception in a vertical position and mounted in a plastic housing that is fastened to an appropriate wall or surface. In any event, a signal 124 is transmitted and/or received by an antenna 126. The received or transmitted signal is routed to a switch controller 128 which compares the signal to codes previously stored in a memory device 130. It will be appreciated that the memory device may be external or incorporated internally within the controller 128. It will further be appreciated that the controller contains the necessary hardware, software and memory for implementing the features discussed herein. The switch 40 includes an on button 132 and an off button 134 which allows for direct control of the load if desired. Status lights 138 and 140 may be employed to indicate the status of the switch which can then be compared to the operational state of the load. In the preferred embodiment, the light 138 is a green LED and the other light 140 is a red LED. The switch is operable from 120V AC, 60 Hz, signal-phase power (hot and neutral). A third wire is provided as an output to supply power to the load 120. As with the light fixture 38, the switch 40 may use either a rolling code or fixed code format. And the same start up features may also be employed.

Referring now to FIG. 3, it can be seen that a methodology for assigning an operator serial number is designated generally by the numeral 200. This methodology is employed in the event that an operator serial number has not previously been stored in the memory device 27. Learning of a serial number to the operator is a pre-requisite for the fixture, switch or other accessory to be operatively associated to the operator. It will be appreciated that storing a serial number in the memory device 27 during manufacture of the operator 12 provides an additional cost that can be avoided by implementing the methodology associated with the process 200. In any event, at step 202 the manufacturer or authorized installer installs the operator and barrier at step 202. Next, at step 204, the installer actuates the operator learn button 44 so as to place the controller 26 in a learn mode. At step 206, the installer then actuates a transmitter button and generates a pre-stored transmitter number for receipt by the transceiver 22. Although any transmitter button may be actuated from any transmitter device to implement step 206, it is believed that the wall station transmitter will be the first transmitter to be learned to the operator 12 inasmuch as an install switch 66 must be actuated to complete the installation of the barrier. Accordingly, the transmitter number is generated by the transceiver 56 and received by the transceiver 22 while the controller 26 is in the learn mode. Following this, at step 208, the controller 26 will determine whether the transmitter number received during the learned mode is a valid number. In other words, if the transmitter number is not in a format that matches with what is expected by the controller 26 then that particular transmitter number will be rejected and the methodology bypasses the remaining steps. Of course, other constraints could be used to ensure that the transmitter number is acceptable. Such may occur if an installer attempts to utilize a transmitter that is not proprietary to the manufacturer of the operator or there is some defect with the transmitter. In any event, if the transmitter number is valid at step 208 then that particular transmitter number is stored in memory 27 at step 210 and that particular transmitter number is now specifically associated with that operator. In other words, any time the transmitter is actuated within radio frequency range of the operator it will be recognized and the appropriate action will be taken. Next, at step 212, the controller 26 derives an operator serial number from the internal timer 28 or, in the alternative, the controller parses the transmitter number so as to generate the operator serial number.

It will be appreciated that the timer is utilized as a random number generator and the learning of the transmitter number is used as a random event. Preferably, the timer 28 is a 16-bit timer which is clocked at a pre-determined rate such as 250 KHz. At each clocking, the number generated is incremented by one count. Since there are 16-bits the timer yields $2^{16}$ or 65,536 different numbers. Selection of a particular number is generated by a random event which, in this instance, is the user input of actuating a button of the transmitter or any other command device. Of course, the number of bits used and the random event could be varied if needed.

In the alternative, the operator may derive a serial number from the transmitter number. It is envisioned that the proprietary code format for communications between the transmitters and the operator may be utilized. This format consists of a unique serial number for each control wherein the serial number is 28 bits which produces a set of 268,435,456 possible serial numbers. Once this serial number is received, the controller 26 may parse or select a predetermined number of the bits so as to generate the operator serial number. Accordingly, it is believed that only the lower 16-bits of the transmitter serial number need to be used. This allows for generation of 65,536 different operator serial numbers. As noted previously, the number of different serial numbers for the operator is not as significant inasmuch as these serial numbers are only utilized for the non-security related control functions, i.e., the turning on and off of the light fixture 38 or the switch 40. Of course, if a more secure serial number is needed, additional bits could be utilized to generate a higher number of serial numbers.

Returning now to the methodology 200, after the operator serial number is derived, it is stored at step 214 in the memory device 27. Following this, the installer, at step at 216, associates the operator 12 with the accessory, which may either be the light fixture 38 or the switch 40. Although different learning or programming scenarios may be employed, it is envisioned that after the serial number is associated with the operator, the fixture 38 or switch 40 will be placed in a learn mode by actuation of the appropriate button 112 or 132/134. Once in the learn mode, the user or installer actuates the program button 42 which causes the controller 26 to generate the learned operator serial number via the transceiver 22 which is then received by the corresponding transceiver 100 or 122. And activation of any of the wall station switches 62–72 could be used to initiate the learning scenario. The fixture or switch then indicates acceptance or denial of the serial number by performing illumination of the light or various LEDs 116 or 138/140 associated with each component in a predetermined manner. Other indicators such as an audible announcement could be used to confirm learning. Finally, at step 220, the process is exited and the installer may continue with other learning processes or the system 10 may be ready for use.

Once the operator's serial number is derived and stored in the memory device 27, the controller 26 may be programmed to always use this first learned serial number and never allowed to be erased or changed, even if all the other transmitter numbers are erased. In the alternative, if all transmitters 30, 32 and 34 are erased from the operator's memory, then the operator's serial number may also be erased. Erasure of the serial numbers may be implemented by holding the program button 42 in for an extended period of time such as 15 seconds. Once another first wall station is taught to the operator 12, then the operator will utilize the newly derived operator serial number for communicating with the fixture or switch.

The advantages of the seeding of serial numbers to the operator should be readily apparent to one skilled in the art. In particular, the association of a serial number with the operator by utilizing software sequencing avoids the need for associating a serial number in the factory. By allowing the operator's software to derive a serial number, operator specific serial numbers do not need to be stored in a database for later access, nor do previously stored serial numbers need to be associated with a controller. Accordingly, this methodology eliminates the need for user accessible channel selection which is present in some of the prior art and the cost of producing the operator are reduced inasmuch as no external electronic hardware is required.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An operator system for a motorized barrier and related accessory, comprising:

at least one transmitter capable of generating wireless signals, said at least one transmitter configured to send a transmitter number;

an accessory device which controls an electrical load, said device capable of receiving wireless signals; and an operator which controls the motorized barrier, said operator initially provided without a serial number, said operator capable of receiving said wireless signals to control the motorized barrier, said operator receiving said transmitter number from said at least one transmitter when in a learn mode, verifying that said transmitter number is in a proper format and generating a serial number for said operator upon receipt of said transmitter number, wherein said serial number is subsequently taught to said accessory device to enable operation thereof.

2. The system according to claim 1, wherein said operator comprises:

a transceiver for at least receiving said wireless signals; and a controller connected to said transceiver, said controller having said serial number associated therewith that is recognizable by said accessory device.

3. The system according to claim 2, wherein said transceiver of said operator receives an accessory signal from said at least one transmitter and generates a corresponding relay signal received by said accessory device for operation thereof.

4. The system according to claim 2, wherein said controller randomly generates said serial number upon first learning of said at least one transmitter to said controller.

5. The system according to claim 4, wherein said serial number is non-erasable once determined.

6. The system according to claim 2, wherein said controller derives said serial number from a timer.

7. The system according to claim 2, wherein said at least one transmitter has a pre-stored transmitter number, and wherein said controller derives said serial number from said pre-stored transmitter number.

8. The system according to claim 7, wherein said pre-stored transmitter number has a predetermined number of bits, and wherein said serial number is derived from a number of bits less than or equal to said predetermined number of bits.

9. The system according to claim 1, wherein said transmitter generates said wireless signals at a first frequency range, and said operator generates operator wireless signals received by said accessory device at a second frequency range different from said first frequency range when said transmitter wireless signals are received.

10. A method for enabling an operator to control a motorized barrier and an accessory device, comprising:

receiving a transmitter number at an operator without an initially assigned serial number;

verifying by said operator that said transmitter number is in a proper format;

associating a serial number with said operator, if said transmitter number is in a proper format; and recognizing said serial number by an accessory device for operation thereof.

11. The method according to claim 10, further comprising:

providing a controller with the operator; and storing said serial number in association with said controller.

12. The method according to claim 11, wherein said associating step comprises:

learning a first transmitter to said operator; and generating said serial number upon completion of said learning step.

13. The method according to claim 12, further comprising:

designating permanently said serial number.

14. The method according to claim 11, further comprising:

deriving said serial number from a timer maintained by said controller.

15. The method according to claim 11, further comprising:

pre-storing said transmitter number in a first transmitter; and deriving said serial number from said transmitter number.

16. The method according to claim 12, further comprising:

parsing said transmitter number to derive said serial number.

17. An operator system for a motorized barrier and related accessory, comprising:

at least one transmitter capable of generating wireless signals;

an accessory device which controls an electrical load, said device capable of receiving wireless signals;

an operator without an initially assigned serial numbers which controls the motorized barrier; and a controller associated with said operator, said controller receiving said wireless signals to control the motorized barrier and generating wireless signals to control said accessory device, said controller randomly generating an operator serial number from a transmitter number sent from said transmitter at the time of learning said at least one transmitter to said operator, wherein said controller emits said operator serial number when sending signals to said accessory device.

18. An operator system for a motorized barrier operator and related accessory comprising:

at least one transmitter capable of generating wireless signals, said at least one transmitter having a pre-stored transmitter number;

an accessory device which controls an electrical load, said device capable of receiving wireless signals;

an operator without an initially assigned serial number which controls the motorized barrier; and a controller associated with said operator, said controller receiving said wireless signals to control the motorized barrier and generating wireless signals to control said accessory device, said controller when in a learn mode deriving an operator serial number from said pre-stored transmitter number, wherein said controller emits said operator serial number when sending signals to said accessory device.

* * * * *